(12) United States Patent
Bhatnagar et al.

(10) Patent No.: US 8,625,993 B2
(45) Date of Patent: Jan. 7, 2014

(54) WAVELENGTH-SWITCHED OPTICAL ADD-DROP MULTIPLEXER WITH WAVELENGTH BROADCASTING CAPABILITY

(75) Inventors: Vipul Bhatnagar, Kensington, MD (US); Balakrishnan Sridhar, Elliot City, MD (US)

(73) Assignee: Ciena Corporation, Hanover, MD (US)

( * ) Notice: Subject to any disclaimer, the term of this patent is extended or adjusted under 35 U.S.C. 154(b) by 941 days.

(21) Appl. No.: 11/970,575

(22) Filed: Jan. 8, 2008

(65) Prior Publication Data

US 2009/0175620 A1 Jul. 9, 2009

(51) Int. Cl.
*H04J 14/02* (2006.01)

(52) U.S. Cl.
USPC .................... 398/83; 398/84; 398/79

(58) Field of Classification Search
USPC ............... 398/83, 82, 79, 45, 84, 43
See application file for complete search history.

(56) References Cited

U.S. PATENT DOCUMENTS

| 7,200,331 B2* | 4/2007 | Roorda et al. ............. 398/58 |
| 2005/0226621 A1* | 10/2005 | Kikuchi et al. ............ 398/83 |
| 2007/0172240 A1* | 7/2007 | Terai et al. ................ 398/83 |

* cited by examiner

*Primary Examiner* — M. R. Sedighian
(74) *Attorney, Agent, or Firm* — Clements Bernard PLLC; Christopher L. Bernard; Lawrence A. Baratta, Jr.

(57) ABSTRACT

The present invention provides a wavelength-switched reconfigurable optical add-drop multiplexer (R-OADM) with wavelength broadcasting capability, such that asymmetric video signal distribution and the like can be performed without sacrificing with respect to component complexity and expense. The present invention utilizes an optical splitting and combining device with the wavelength-switched R-OADM to allow the R-OADM to support network-wide wavelength broadcasts without requiring external regeneration and extra optical transceiver equipment.

15 Claims, 6 Drawing Sheets

US 8,625,993 B2

WAVELENGTH-SWITCHED OPTICAL ADD-DROP MULTIPLEXER WITH WAVELENGTH BROADCASTING CAPABILITY

FIELD OF THE INVENTION

The present invention relates generally to the optical networking and optical communication fields. More specifically, the present invention relates to a wavelength-switched reconfigurable optical add-drop multiplexer (R-OADM) with wavelength broadcasting capability.

BACKGROUND OF THE INVENTION

Optical networks are starting to utilize reconfigurable optical-add drop multiplexers (R-OADMs) to switch wavelengths in a wavelength division multiplexed system (WDM). R-OADMs provide the ability to switch any wavelength without the need to perform an electrical conversion. Additionally, R-OADMs provide network operators advantages with regards to reconfigurations, network routing, power balancing, and the like. As such, network operators are deploying R-OADM devices in metropolitan and long-haul optical networks.

R-OADMs typically utilize either a wavelength-switched architecture or a broadcast-and-select architecture. The wavelength-switched architecture consolidates the wavelength switching and multiplex/de-multiplex (MUX/DE-MUX) functions within the same functional block (i.e. a wavelength selective switch (WSS)), making the wavelength-switched architecture relatively less complex and less expensive (requiring N switches for N node degrees). The broadcast-and-select architecture, on the other hand, requires MUX/DEMUX functions that are independent from the wavelength switching function, making the broadcast-and-select architecture relatively more complex and expensive (requiring $N \times (N-1)$ wavelength blockers for N node degrees). These architectures are inherently contradictory. In the wavelength-switched architecture, an inbound (or added) wavelength is switched to either an output port or a drop port. If switched to a drop port, the inbound (or added) wavelength cannot reach additional subscribers, as required by the broadcast-and-select architecture. Users may re-generate and transmit the received broadcast signal, but this requires the use of additional transceivers, increasing the number of components utilized and compromising overall system reliability. Thus, wavelength-switched R-OADMs do not support a wavelength broadcasting function, as broadcast-and-select R-OADMs do.

In modern networks, bandwidth growth is being driven in metropolitan and long-haul optical networks by video transport as high-definition television (HDTV), video on-demand (VOD), and other video-related services proliferate. Broadcast video signal distribution is inherently asymmetric. A small number of video signals are received by a large number of subscribers, the subscribers typically transmitting no signals. For example, SONET/SDH systems can utilize a drop-and-continue architecture allowing a single signal, such as an OC-12/STM-4, OC-48/STM-64, etc., to drop at multiple locations and continue. With regard to optical equipment supporting video signal distribution, WDM networks typically utilize the broadcast-and-select architecture for R-OADMs, sacrificing with respect to component complexity and expense.

Thus, what is needed in the art is a wavelength-switched R-OADM with wavelength broadcasting capability, such that unidirectional video signal distribution and the like can be performed without sacrificing component complexity and expense.

BRIEF SUMMARY OF THE INVENTION

In various exemplary embodiments, the present invention provides a wavelength-switched reconfigurable optical add-drop multiplexer (R-OADM) with wavelength broadcasting capability, such that asymmetric video signal distribution and the like can be performed without sacrificing with respect to component complexity and expense. The present invention utilizes an optical splitting and combining device with the wavelength-switched R-OADM to allow the R-OADM to support network-wide wavelength broadcasts without requiring regeneration and extra optical transceiver equipment.

In an exemplary embodiment of the present invention, a wavelength-switched reconfigurable optical add-drop multiplexer (ROADM) with wavelength broadcasting capability includes a wavelength selective switch including an input port operable for receiving an input optical signal and a plurality of output ports operable for outputting a plurality of output optical signals, wherein at least one of the plurality of output ports is designated as a broadcast port, and wherein the broadcast port is operable for outputting an output optical signal that is to be both locally received and broadcast; and a splitter coupled to the broadcast port of the wavelength selective switch, wherein the splitter splits the output optical signal outputted by the broadcast port into a locally received optical signal and a broadcast optical signal. The wavelength-switched ROADM can further include a demultiplexer coupled to the splitter and operable for demultiplexing the locally received broadcast signal. Optionally, the wavelength-switched ROADM further includes one or more receivers coupled to the demultiplexer and operable for receiving the locally received optical signal. Alternatively, the wavelength-switched ROADM further includes a combiner coupled to the splitter and operable for combining the broadcast optical signal with one or more locally added optical signals. The wavelength-switched ROADM can further include a combiner coupled to the combiner and operable for multiplexing the combined broadcast optical signal and one or more locally added optical signals with one or more express optical signals. Optionally, the one or more other optical signals include one or more express optical signals received from the wavelength selective switch.

In another exemplary embodiment of the present invention, a wavelength broadcasting method includes receiving an optical signal; splitting the optical signal into a locally received optical signal and a broadcast optical signal; locally receiving the locally received optical signal; and broadcasting the broadcast optical signal. The wavelength broadcasting method can further include demultiplexing the locally received optical signal prior to locally receiving the locally received optical signal. Optionally, the wavelength broadcasting method further includes combining the broadcast optical signal with one or more locally added optical signals prior to broadcasting the broadcast optical signal. Alternatively, the wavelength broadcasting method further includes multiplexing the combined broadcast optical signal and one or more locally added optical signals with one or more express optical signals prior to broadcasting the broadcast optical signal. Optionally, the one or more other optical signals include one or more express optical signals.

In yet another exemplary embodiment of the present invention, a multi-degree wavelength-switched ROADM with wavelength broadcasting capability includes a wavelength selective switch including an input port operable for receiving an input optical signal and a plurality of output ports operable for outputting a plurality of output optical signals, wherein at least one of the plurality of output ports is designated as a broadcast port, and wherein the broadcast port is operable for outputting an output optical signal that is to be both locally received and broadcast; and a 1:N splitter coupled to the broadcast port of the wavelength selective switch, wherein the 1:N splitter splits the output optical signal outputted by the broadcast port into a locally received optical signal and N broadcast optical signals, wherein N includes number of degrees. The multi-degree wavelength-switched ROADM can further include a combiner located between the broadcast port of the wavelength selective switch and the 1:N splitter, wherein the combiner combines a broadcast optical signal received from the broadcast port with a locally added broadcast optical signal, and wherein the combiner outputs the combination of the broadcast optical signal and the locally added broadcast optical signal to the 1:N splitter.

Optionally, the multi-degree wavelength-switched ROADM further includes a wavelength selective combiner including a plurality of input ports operable for receiving input optical signals and an output port operable for outputting an output optical signal; wherein the an output of the 1:N splitter is coupled to one of the plurality of inputs. Alternatively, at least one of the multi-degrees couples a broadcast optical signal for combination in one of the plurality of inputs. The wavelength selective combiner is configured to selectively combine optical signals from the plurality of inputs to the output. The multi-degree wavelength-switched ROADM can further include a demultiplexer coupled to the 1:N splitter and operable for demultiplexing the locally received optical signal. Optionally, the multi-degree wavelength-switched ROADM further includes one or more receivers coupled to the demultiplexer and operable for receiving the locally received optical signal. Alternatively, the multi-degree wavelength-switched ROADM further includes a multiplexer coupled to the combiner and operable for multiplexing the combined broadcast optical signal and one or more other optical signals with one or more other optical signals. Optionally, the one or more other optical signals include one or more express optical signals received from the wavelength selective switch.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides a wavelength-switched reconfigurable optical add-drop multiplexer (R-OADM) with wavelength broadcasting capability, such that unidirectional video signal distribution and the like can be performed without sacrificing with respect to component complexity and expense. The present invention utilizes an optical splitting and combining device with the wavelength-switched R-OADM to allow the R-OADM to support network-wide wavelength broadcasts without requiring external regeneration and extra optical transceiver equipment.

Figure 1:
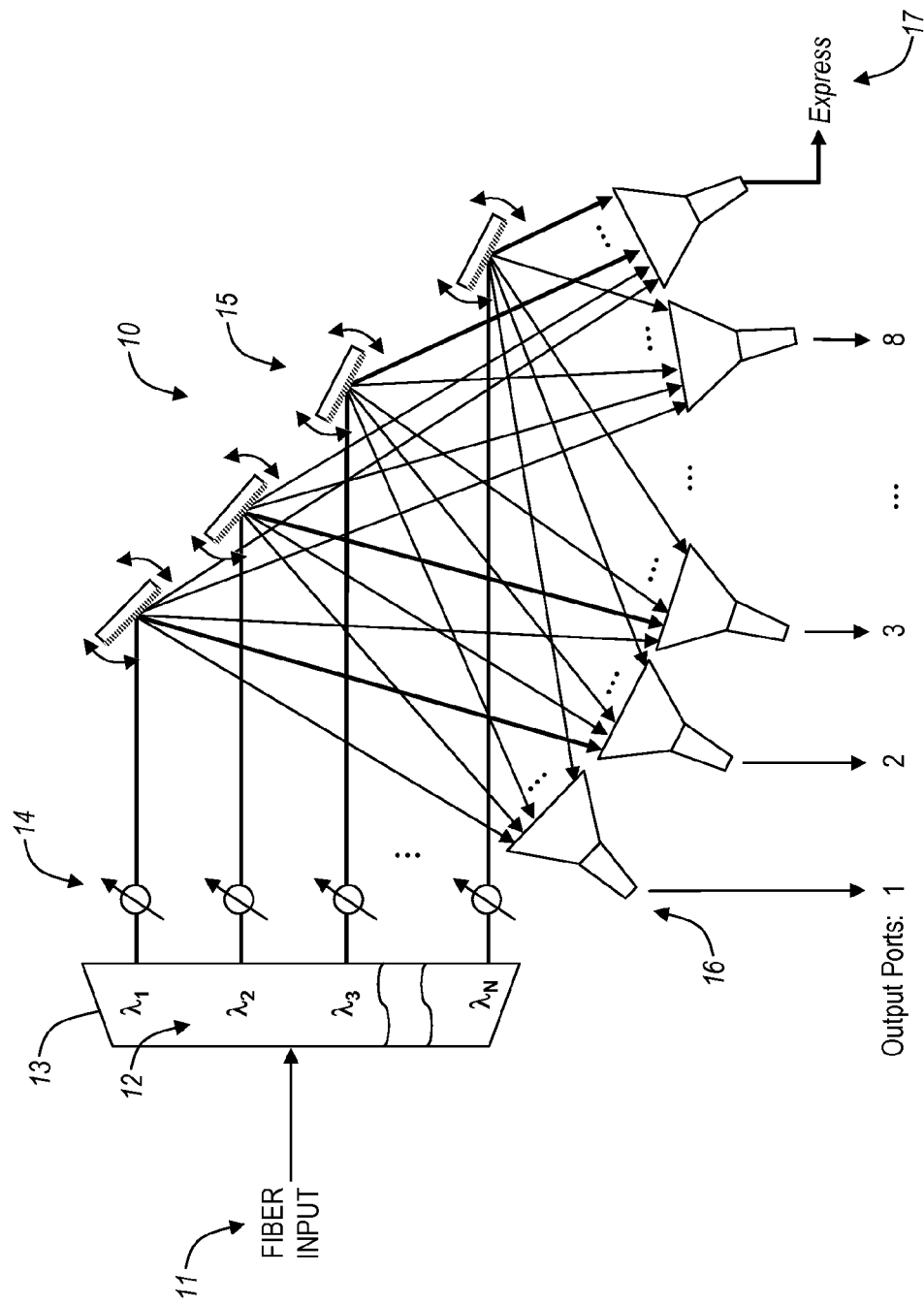
FIG. 1 is a schematic diagram illustrating one exemplary embodiment of a conventional micro-electromechanical system (MEMS)-based wavelength selective switch (WSS), such as that used in conjunction with the systems and methods of the present invention.

FIG. 1 is a schematic diagram illustrating one exemplary embodiment of a conventional micro-electromechanical system (MEMS)-based wavelength selective switch (WSS) 10, such as that used in conjunction with the systems and methods of the present invention. A fiber input 11 including optical signals of a plurality of wavelengths $\lambda_1, \lambda_2, \ldots \lambda_n$ 12 is input into a de-multiplexer (DEMUX) 13, such as a diffraction grating or the like. The DEMUX 13 separates each wavelength 12 of the fiber input 11. Optionally, a plurality of variable optical attenuators (VOAs) 14 are provided following the DEMUX 13.

The VOAs 14 are configured to provide variable optical attenuation to each wavelength 12, and the VOAs 14 can be remotely and dynamically set to a range of values. The WSS 10 also includes a MEMS mirror 15 associated with each wavelength 12. These MEMS mirrors 15 are micro-mirrors that deflect each optical signal to an appropriate output port 16. Advantageously, the WSS 10 is fully reconfigurable for adding, dropping, and expressing through optical signals. Because there is a MEMS mirror 15 for each optical signal, any optical signal can be dropped to any output port 16. Additionally, multiple wavelengths, including all wavelengths, can be dropped to a single output port 16, such as an express port 17 or the like.

Figure 2:
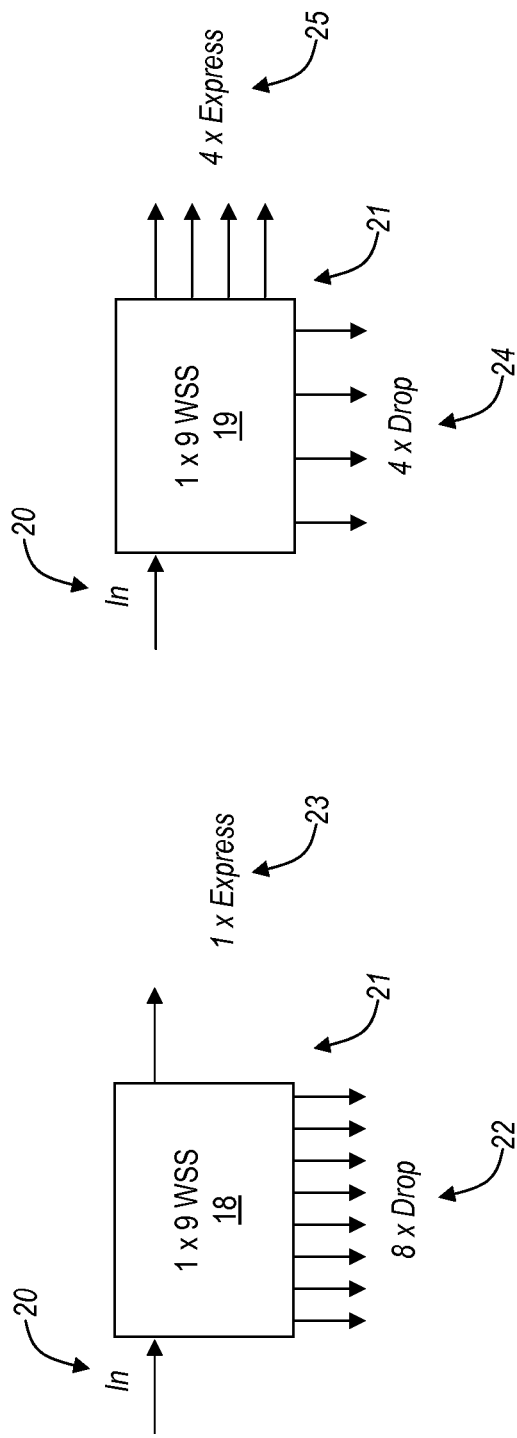
FIG. 2 is a series of schematic diagrams illustrating exemplary embodiments of conventional 1×9 WSSs, such as those used in conjunction with the systems and methods of the present invention.

FIG. 2 is a series of schematic diagrams illustrating exemplary embodiments of conventional 1×9 WSSs 18 and 19, such as those used in conjunction with the systems and methods of the present invention. The WSSs 18 and 19 are each configured to direct each wavelength from a common input port 20 to any one of N output ports 21. To indicate this device fan out, these devices are typically classified as "1×N" devices, with a "1×9" WSS referring to a 10-port device, with 1 common input port and 9 output ports. For example, WSS 18 is a 1×9 WSS with a common input port 20, eight drop ports 22, and one express port 23.

WSS 18 can be utilized at a node where up to eight optical signals need to be dropped, with the remaining optical signals passing through as express signals. Alternatively, WSS 19 utilizes the same hardware configured for a common input port 20, four drop ports 24, and four express ports 25, such as where a node has multiple-degree interconnection. Advantageously, the WSSs 18 and 19, as well as other configurations, provide nodal flexibility to add, drop, and express optical signals with the same MEMS-based hardware.

Figure 3:
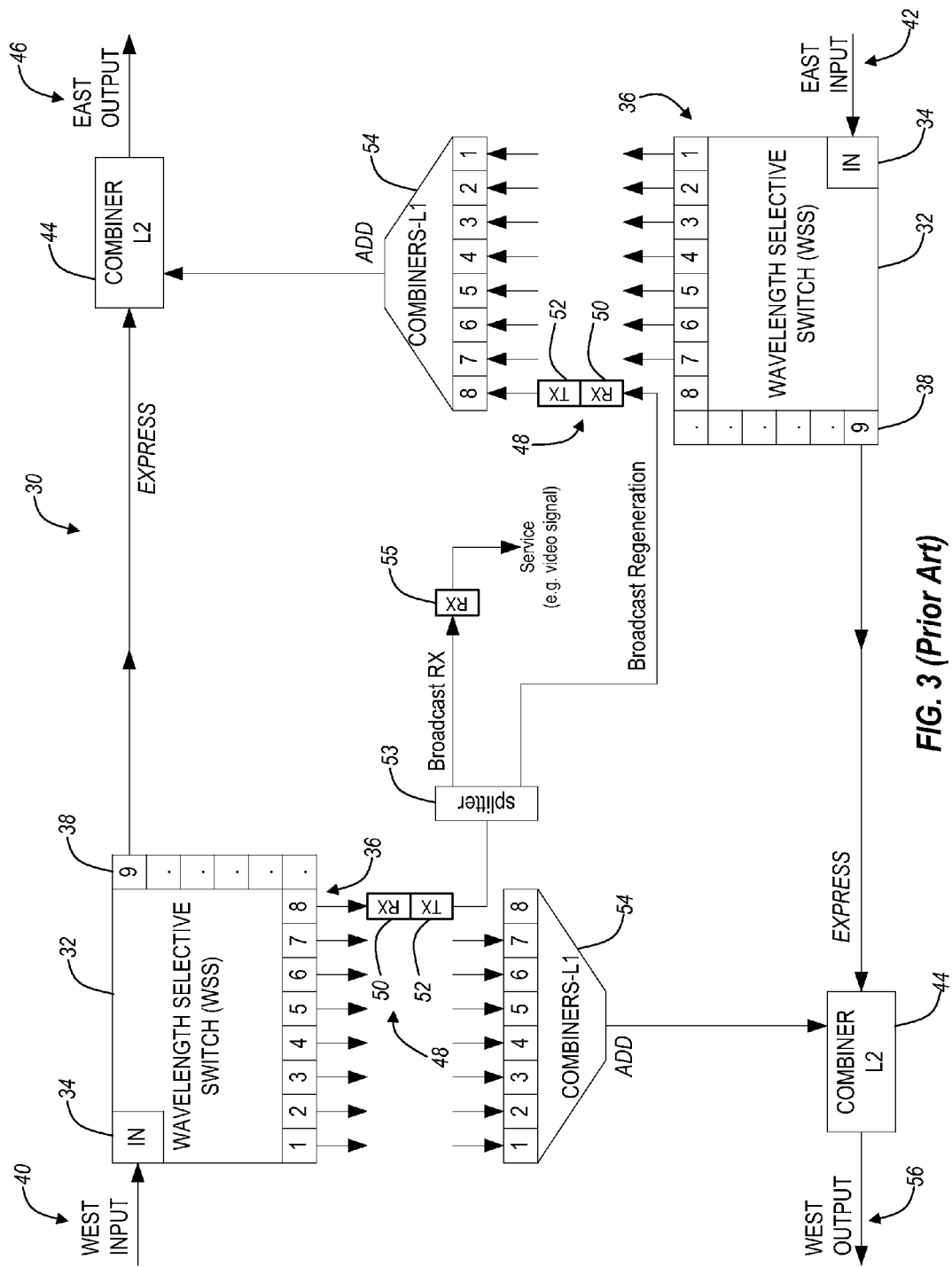
FIG. 3 is a schematic diagram illustrating one exemplary embodiment of a conventional reconfigurable optical add-drop multiplexer (R-OADM) that utilizes a wavelength-switched architecture and supports wavelength broadcasting, albeit inefficiently.

FIG. 3 is a schematic diagram illustrating one exemplary embodiment of a conventional reconfigurable optical add-drop multiplexer (R-OADM) 30 that utilizes a wavelength-switched architecture and supports wavelength broadcasting, albeit inefficiently by splitting and subsequently regenerating the broadcast wavelength at each instance of broadcast wavelength drop. In the west-to-east direction, the R-OADM 30 includes a WSS 32 having an input port 34 and a plurality of output ports, including output ports 1-8 36 and express port 9 38 in the example illustrated. It will be readily apparent to those of ordinary skill in the art that other configurations could be utilized. Wavelengths associated with a west input 40 are switched to one or more of output ports 1-8 36 and/or express port 9 38. Wavelengths can also be switched to a wavelength termination point (i.e. a "drop" port). Wavelengths switched to express port 9 38 essentially bypass the node and are multiplexed with locally added wavelengths, by combiner L2 44 for transmission via an east output 46 to another node, for example.

Wavelengths switched to output ports 1-8 36 are received by one or more subscribers (not shown for output ports 1-7 36). With regard to broadcast wavelengths, if it is desired to further broadcast these wavelengths to the remaining nodes, the wavelengths are received by corresponding transceiver 48, each consisting of a paired receiver 50 and transmitter 52. The wavelengths dropped from output port 8 36 are received by receiver 50, and retransmitted by transmitter 52. To enable drop and continue of broadcast wavelengths, a splitter 53 is included to split the optical output of the transmitted 52 to a local receiver 55 and a broadcast regenerator consisting of a transceiver 48 with a receiver 50 and a transmitter 52. The output of the transmitter 52 is added back through combiner 54 and subsequently combined with express wavelengths through combiner 44. Disadvantageously, this wavelength broadcasting method requires N−1 electrical transceivers 48 to support subscribers at N nodes. This presents monetary expense, space constraints, power consumption problems, and management burdens for the network operator.

The wavelength-switched R-OADM with wavelength broadcasting capability of the present invention incorporates an optical splitting and combining apparatus within its structure such that broadcasting can be carried out without the need for regeneration. Advantageously, the present invention eliminates the need for electrical regenerators 48 for providing wavelength broadcasting with the wavelength-switched R-OADM.

Figure 4:
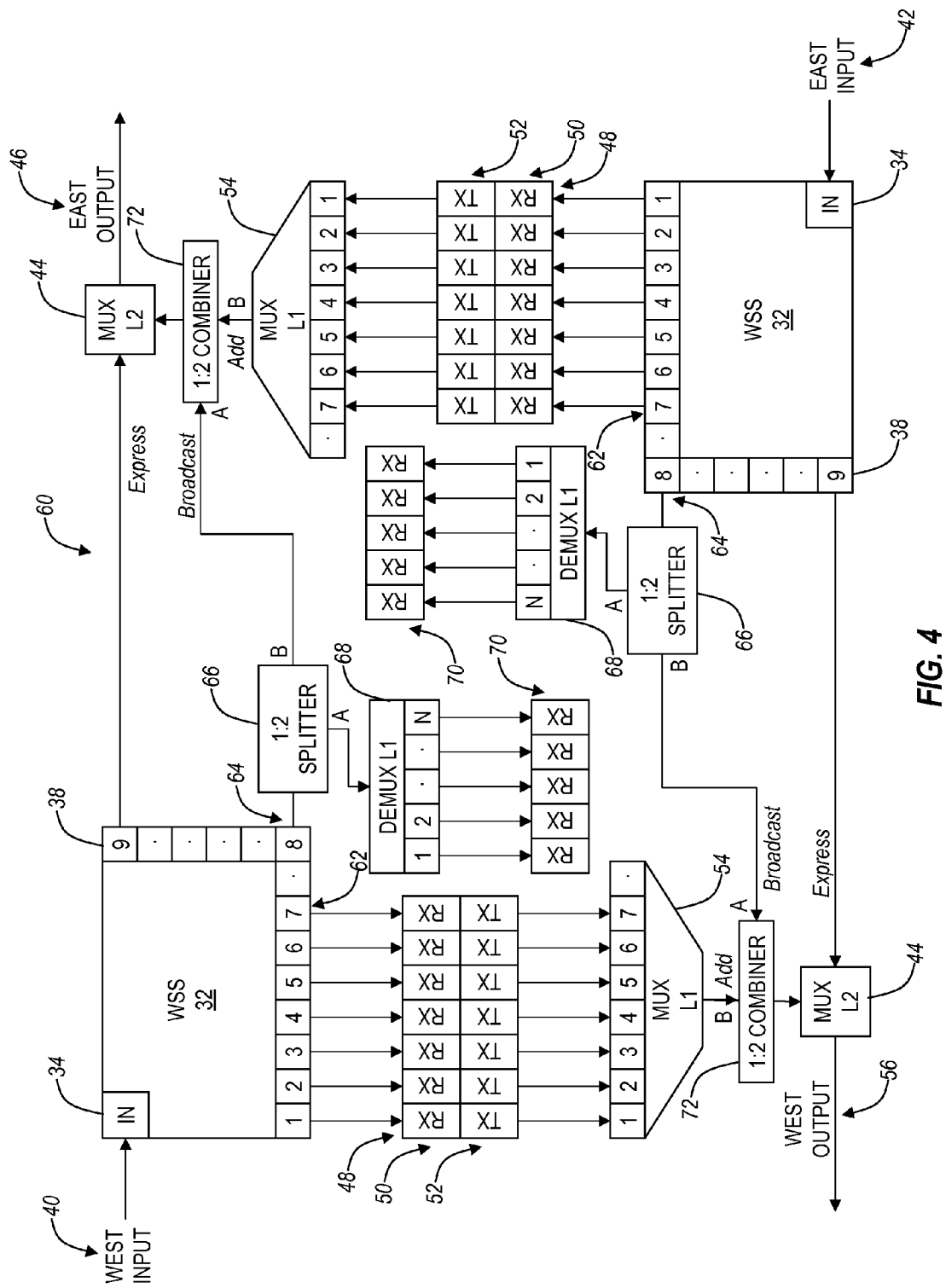
FIG. 4 is a schematic diagram illustrating one exemplary embodiment of the wavelength-switched R-OADM configuration with wavelength broadcasting capability of the present invention.

FIG. 4 is a schematic diagram illustrating one exemplary embodiment of the wavelength-switched R-OADM configuration 60 with wavelength broadcasting capability of the present invention. The R-OADM configuration 60 is a degree 2 configuration with a west input/output 40,56 and an east input/output 46,42. In the west-to-east direction, the R-OADM configuration 60 again includes a WSS 32 having an input port 34 and a plurality of output ports, including output ports 1-7 62 and express port 9 38 in the example illustrated. It will be readily apparent to those of ordinary skill in the art that other configurations could be utilized. At each degree, an output port (output port 8 64 in the example illustrated) is designated as a broadcast port. Wavelengths associated with a west input 40 are switched to one or more of output ports 1-7 62 for locally dropped traffic, express port 9 38 for bypass traffic, and/or broadcast port 8 64 for broadcast traffic. Of course, wavelengths to be received and broadcast are switched to broadcast port 8 64. The broadcast port 8 output is then divided by a wavelength-independent power splitter, such as a 1:2 wavelength-independent power splitter 66. Additionally, for multi-degree configurations, the wavelength-independent power splitter can utilize a 1:N wavelength splitter where N is the number of degrees in which broadcast is required.

Output A of the 1:2 wavelength-independent power splitter 66 is applied to demultiplexer L1 (DEMUX L1) 68 to which receivers 70 are connected for each of the received wavelengths. Output B of the 1:2 wavelength-independent power splitter 66 is applied to input A of a 2:1 wavelength independent combiner 72 and are combined with wavelengths associated with the east input 42. Wavelengths switched to express port 9 38 essentially bypass the node and are multiplexed with broadcast wavelengths and locally added wavelengths, as appropriate, by MUX L2 44 for transmission via the east output 46 to another node, for example. Thus, broadcast wavelengths coming from the west are locally dropped and forwarded to the east with no electrical regeneration and no blocking. The east side of the R-OADM configuration 60 works in a substantially similar manner to the west side of the R-OADM 60. Advantageously, this allows the transponders/regenerators 48 to be utilized for local add/drop traffic at the R-OADM configuration 60 or eliminated if not required.

Figure 5:
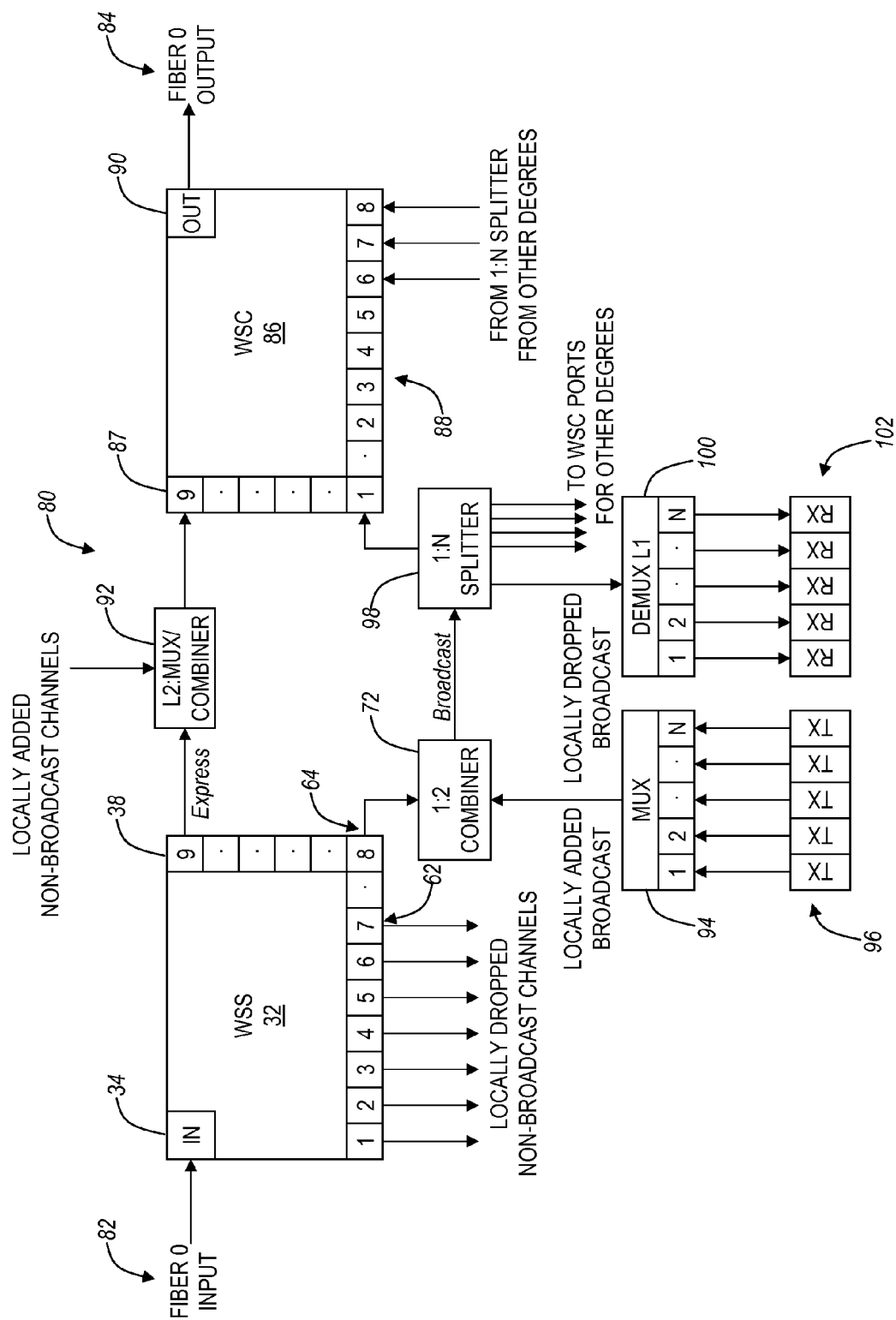
FIG. 5 is a schematic diagram illustrating another exemplary embodiment of the wavelength-switched R-OADM configuration with wavelength broadcasting capability of the present invention, this exemplary embodiment extending the concepts of FIG. 4 to a multi-degree node.

FIG. 5 is a schematic diagram illustrating another exemplary embodiment of the wavelength-switched R-OADM configuration 80 with wavelength broadcasting capability of the present invention, this exemplary embodiment extending the concepts of FIG. 4 to a multi-degree node. In a multi-degree node, there are N fibers (for N degrees) entering the node, and N fibers leaving the node. The broadcast channels in a fiber can potentially be inserted in any or all of the fibers exiting the node in N−1 directions as network requirements demand. For illustration purposes, FIG. 5 illustrates a single fiber 0 input 82 and output 84 from the R-OADM configuration 80. Those of ordinary skill will recognize that the R-OADM configuration 80 can include additional fibers propagating in other directions.

At the fiber 0 input 82, the R-OADM configuration 80 again includes a WSS 32 having an input port 34 and a plurality of output ports, including output ports 1-7 62 and express port 9 38 in the example illustrated. It will be readily apparent to those of ordinary skill in the art that other configurations could be utilized. At each degree requiring broadcast, an output port (output port 8 64 in the example illustrated) is designated as a broadcast port. Wavelengths associated with a fiber 0 input 82 are switched to one or more of output ports 1-7 62 for locally dropped non-broadcast channels, express port 9 38 for express non-dropped channels, and/or broadcast port 8 64 for broadcast channels. Of course, wavelengths to be received and broadcast are switched to broadcast port 8 64. The broadcast port 8 output is then input to a 1:2 combiner 72. The 1:2 combiner 72 can also receive locally added broadcast traffic on a port from a multiplexer 94 which receives the locally added broadcast traffic from transmitters 96. This allows the addition of locally generated broadcast traffic. The output of the 1:2 combiner 72 is connected to a 1:N splitter 98. One output of the 1:N splitter 98 is connected to a wavelength selective combiner (WSC) 86 (input port 1 88 in the example illustrated). Another output of the 1:N splitter 98 can be utilized for locally dropped broadcast traffic to a demultiplexer 100 which connects to receivers 102. Other outputs from the 1:N splitter 98 are connected to WSC 86 ports (not shown) for other degrees in the multi-degree R-OADM configuration 80. Note, the 1:2 combiner 72 may be omitted with the broadcast port 8 64 directly connected to the 1:N splitter 98 if there are no requirements for locally added broadcast traffic.

It is desirable to have the ability to control which broadcast wavelengths get introduced in each fiber direction or degree. This function is implemented using the WSC 86. The WSC 86 utilizes similar hardware as the WSS 32, but is configured to perform the inverse function. The WSC 86 includes a plurality of input ports 86,88 (illustrated in this example as input port 9 87 and input ports 1-8 88). The inputs to the plurality of input ports 87,88 are selectively combined into a common output port 90. The WSC 86 can have one port reserved for local add-drop and express point-to-point traffic (input port 9 87 in the example illustrated receiving the output of express port 9 38 and a combination with locally added non-broadcast channels from a multiplexer/combiner 92). The multiplexer/combiner 92 provides similar functionality as the MUX 54 and 1:2 combiner 72 in FIG. 4 and can include similar hardware. Another port on the WSC 86 can be used to add locally generated broadcast traffic and broadcast traffic from the same fiber (input port 1 88 in the example illustrated).

The broadcast traffic from other fiber inputs can be coupled to the plurality of input ports 88 (input ports 2-8 88 in the example illustrated) of the WSC 86. The WSC 86 is configured to selectively couple all the express traffic and the broadcast traffic from the other degrees to the output 90 from transport on the fiber 0 output 84. The local broadcast add/drop (through multiplexer 94 and demultiplexer 100) allows the addition of add/drop traffic generated locally. Each fiber pair can have its own local add/drop multiplexers/demultiplexers 94,100. This arrangement can preserve the ability to do selective broadcasts and also to regenerate broadcast channels at the node.

Figure 6:
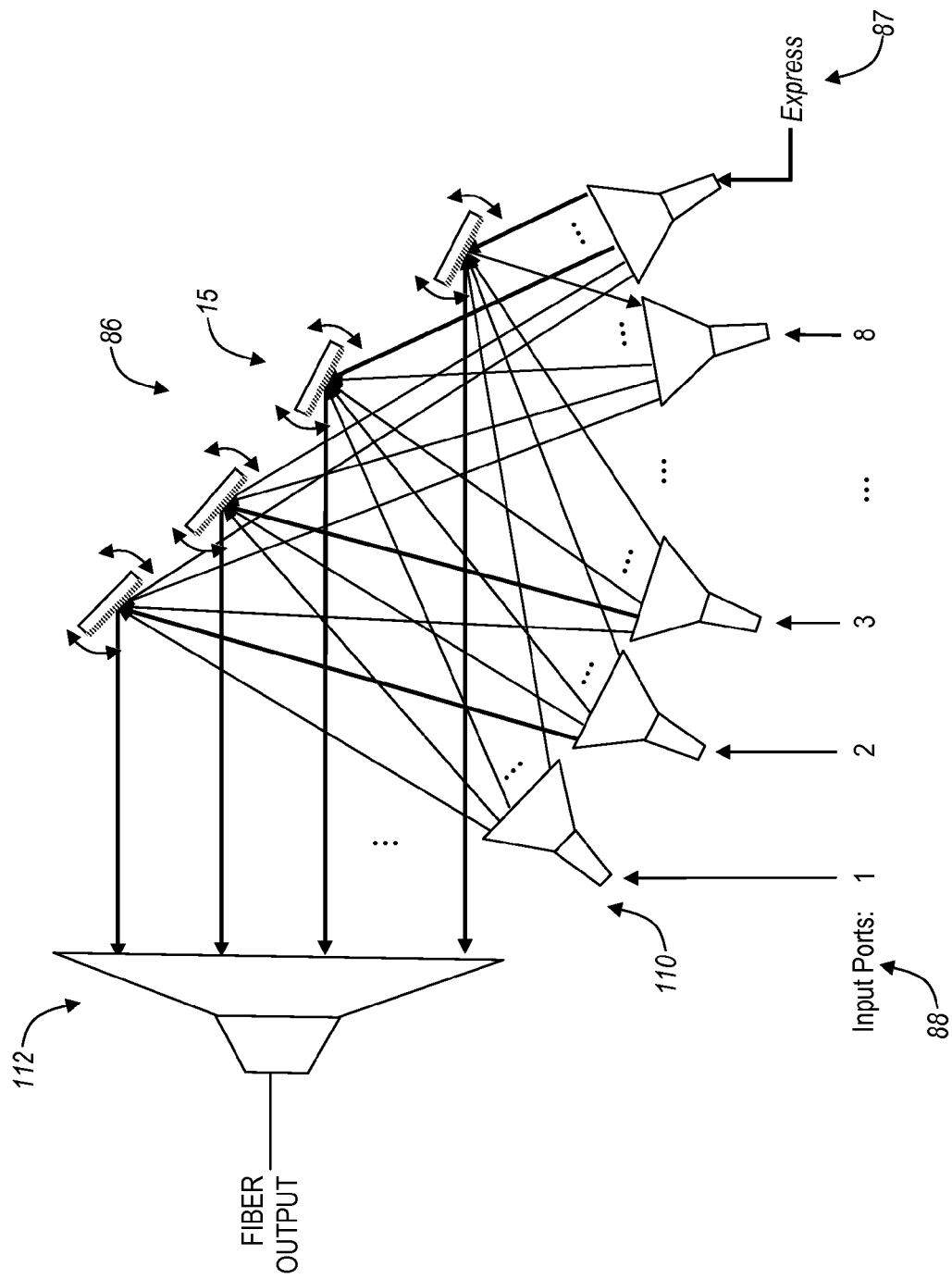
FIG. 6 is a schematic diagram illustrating one exemplary embodiment of a micro-electromechanical system (MEMS)-based wavelength selective combiner (WSC), according to an exemplary embodiment of the present invention.

FIG. 6 is a schematic diagram illustrating one exemplary embodiment of a micro-electromechanical system (MEMS)-based wavelength selective combiner (WSC) 86, such as that used in conjunction with the systems and methods of the present invention. A plurality of input ports 87,88 are each configured to receive a fiber input including a plurality of wavelengths $\lambda_1, \lambda_2, \ldots \lambda_n$. Each of the input ports 87,88 includes a de-multiplexer (DEMUX) 110, such as a diffraction grating or the like. The DEMUX 110 separates each of the plurality of wavelengths for each of the input ports 87,88. Optionally, a plurality of variable optical attenuators (VOAs) (not shown) can be provided following the DEMUX 13.

The WSC 86 also includes a MEMS mirror 15 associated with each of the plurality of wavelengths. These MEMS mirrors 15 are micro-mirrors that deflect each optical signal to a common output port 1112. Advantageously, the WSC 86 is fully reconfigurable for combining optical signals. Because there is a MEMS mirror 15 for each optical signal, any optical signal can be combined from the input ports 87,88 to the output port 112.

The R-OADM configurations 60,80 presented herein can be implemented in a variety of mechanisms. For example, the combiner and splitter elements described herein can include passive modules located external to a R-OADM circuit pack. Here, the broadcast port of the R-OADM is connected through a fiber connection and the broadcast outputs are connected through a fiber connection to a DEMUX or a receiver as required. Alternatively, the combiner and splitter elements can be integrated into existing R-OADM circuit packs to provide an integrated solution.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A wavelength-switched reconfigurable optical add-drop multiplexer with wavelength broadcasting capability, comprising:
    a wavelength selective switch comprising an input port operable for receiving an input optical signal and a plurality of output ports operable for outputting a plurality of output optical signals, wherein at least one of the plurality of output ports is designated as a broadcast port, and wherein the broadcast port is operable for outputting an output optical signal that is to be both locally received and broadcast;
    a splitter coupled to the broadcast port of the wavelength selective switch, wherein the splitter splits the output optical signal outputted by the broadcast port into a locally received optical signal and a broadcast optical signal; and
    a combiner located between the broadcast port of the wavelength selective switch and the splitter, collectively, and a first multiplexer, wherein the combiner combines the broadcast optical signal received from the broadcast port and the splitter, collectively, with a plurality of locally added optical signals multiplexed by the first multiplexer prior to transmitting a resulting signal to a second multiplexer for multiplexing of the resulting signal with an express optical signal.

2. The wavelength-switched reconfigurable optical add-drop multiplexer of claim 1, further comprising a demultiplexer coupled to the splitter and operable for demultiplexing the locally received broadcast signal.

3. The wavelength-switched reconfigurable optical add-drop multiplexer of claim 2, further comprising one or more receivers coupled to the demultiplexer and operable for receiving the locally received optical signal.

4. The wavelength-switched reconfigurable optical add-drop multiplexer of claim 1, wherein the express optical signal comprises one or more express optical signals received from the wavelength selective switch.

5. A wavelength broadcasting method, comprising:
    receiving an optical signal;
    splitting the optical signal into a locally received optical signal and a broadcast optical signal;
    locally receiving the locally received optical signal;
    using a combiner located between a broadcast port of a wavelength selective switch and a splitter, collectively, and a first multiplexer, combining the broadcast optical signal received from the broadcast port and the splitter, collectively, with a plurality of locally added optical signals multiplexed by the first multiplexer and transmitting a resulting signal to a second multiplexer for multiplexing of the resulting signal with an express optical signal; and
    broadcasting the broadcast optical signal.

6. The wavelength broadcasting method of claim 5, further comprising demultiplexing the locally received optical signal prior to locally receiving the locally received optical signal.

7. The wavelength broadcasting method of claim 5, wherein the express optical signal comprises one or more express optical signals received from the wavelength selective switch.

8. A multi-degree wavelength-switched reconfigurable optical add-drop multiplexer with wavelength broadcasting capability, comprising:

a wavelength selective switch comprising an input port operable for receiving an input optical signal and a plurality of output ports operable for outputting a plurality of output optical signals, wherein at least one of the plurality of output ports is designated as a broadcast port, and wherein the broadcast port is operable for outputting an output optical signal that is to be both locally received and broadcast;

a 1:N splitter coupled to the broadcast port of the wavelength selective switch, wherein the 1:N splitter splits the output optical signal outputted by the broadcast port into a locally received optical signal and N broadcast optical signals, wherein N comprises a number of degrees and is an integer; and a combiner located between the broadcast port of the wavelength selective switch and the 1:N splitter, wherein the combiner combines a broadcast optical signal received from the broadcast port with a locally added broadcast optical signal, and wherein the combiner outputs the combination of the broadcast optical signal and the locally added broadcast optical signal to the 1:N splitter.

9. The multi-degree wavelength-switched reconfigurable optical add-drop multiplexer of claim 8, further comprising:

a wavelength selective combiner comprising a plurality of input ports operable for receiving input optical signals and an output port operable for outputting an output optical signal;

wherein an output of the 1:N splitter is coupled to one of the plurality of inputs.

10. The multi-degree wavelength-switched reconfigurable optical add-drop multiplexer of claim 9, wherein at least one of the number of degrees couples a broadcast optical signal for combination in one of the plurality of inputs.

11. The multi-degree wavelength-switched reconfigurable optical add-drop multiplexer of claim 10, wherein the wavelength selective combiner is configured to selectively combine optical signals from the plurality of inputs to the output.

12. The multi-degree wavelength-switched reconfigurable optical add-drop multiplexer of claim 8, further comprising a demultiplexer coupled to the 1:N splitter and operable for demultiplexing the locally received optical signal.

13. The multi-degree wavelength-switched reconfigurable optical add-drop multiplexer of claim 12, further comprising one or more receivers coupled to the demultiplexer and operable for receiving the locally received optical signal.

14. The multi-degree wavelength-switched reconfigurable optical add-drop multiplexer of claim 13, further comprising a multiplexer coupled to the combiner and operable for multiplexing the combined broadcast optical signal and one or more other optical signals with one or more other optical signals.

15. The multi-degree wavelength-switched reconfigurable optical add-drop multiplexer of claim 14, wherein the one or more other optical signals comprise one or more express optical signals received from the wavelength selective switch.

* * * * *